United States Patent [19]

Fumoto et al.

[11] 4,429,225

[45] Jan. 31, 1984

[54] INFRARED THICKNESS MEASURING DEVICE

[75] Inventors: Takabumi Fumoto, Yokosuka; Mutsuo Sawaguchi, Sagamihara, both of Japan

[73] Assignee: Fuji Electric Co., Ltd., Kanagawa, Japan

[21] Appl. No.: 268,231

[22] Filed: May 29, 1981

[30] Foreign Application Priority Data

May 30, 1980 [JP] Japan .................................. 55-71504
Dec. 17, 1980 [JP] Japan ................................ 55-177184

[51] Int. Cl.³ .............................................. G01J 1/00
[52] U.S. Cl. .................................. 250/353; 250/339; 250/341; 250/358.1
[58] Field of Search ............ 250/338, 339, 341, 358.1, 250/359.1, 353

[56] References Cited

U.S. PATENT DOCUMENTS

| | | | |
|---|---|---|---|
| 3,631,526 | 12/1971 | Brunton | 250/339 |
| 3,693,025 | 9/1972 | Brunton | 250/339 |
| 4,015,127 | 3/1977 | Sharkins | 250/341 |
| 4,027,161 | 5/1977 | Williams et al. | 250/339 |

FOREIGN PATENT DOCUMENTS 51-115850 10/1976 Japan .

OTHER PUBLICATIONS

Technical Article by Roger F. Edgar Entitled "Uses of the Infrared Absorption Gauge for On-Line Gauging of Coatings and Film Thickness".

Primary Examiner—Davis L. Willis
Attorney, Agent, or Firm—Brumbaugh, Graves, Donohue & Raymond

[57] ABSTRACT

A device for measuring the thickness of a thin film or the like is provided using infrared rays. A source of infrared rays is positioned on one side of the film. A disk with two apertures is rotatably mounted between the infrared source and the film, with band-pass filters positioned over the apertures in the disk. A concave hemispherical reflector with a reflector surface facing the film is positioned between the infrared source and the film. A hole is formed in the center of the concave reflector through which the infrared rays pass. A convex reflector is positioned between the film and the concave reflector and has a reflecting surface facing the concave reflector. A light collecting guide with a photoelectric sensor is positioned on the opposite side of the film from the infrared source for measuring the intensity of the infrared rays.

4 Claims, 14 Drawing Figures

INFRARED THICKNESS MEASURING DEVICE

BACKGROUND OF THE INVENTION

This invention relates to infrared ray thickness measuring devices, and more particularly, to devices for continuously measuring with high accuracy very thin transparent to semi-transparent plastic films and films with a high degree of surface planeness.

Very thin transparent or semi-transparent plastic films and films having a high degree of surface planeness are generally produced as a continuous sheet. A film thickness gauge is often used to measure the thickness continuously or at periodic intervals to assure a high quality final product. Two types of film thickness gauges have been used to measure the thickness of the film, contact and non-contact types. In a contact type gauge, a dial or a micrometer in direct contact with the film measures the thickness. In a non-contact type, radioactive rays such as beta or gamma rays are applied to penetrate the film. The amount of radioactive rays absorbed by the film is used to determine the thickness of the film.

A significant drawback to the radioactive non-contact type film measuring device lies in the cumbersome and expensive measures required to protect the operator against undue exposure to the radioisotopes. Naturally, the shielding against the radiation significantly increases the cost of the equipment.

Non-contact type thickness gauges have been proposed using infrared radiation to overcome the drawbacks of the radioactive non-contact thickness gauges. These devices are based upon the different absorptions of infrared rays by the film according to the wavelength of the infrared radiation passing through it. Infrared rays with a wavelength of $\lambda_R$ (hereinafter lambda$_R$), the reference wavelength, and having a small light absorption factor, are alternately radiated against the film with rays having a wavelength of $\lambda_M$ (hereinafter lambda$_M$), the measurement wavelength, and having a larger light absorption factor. The intensities of the rays measured after they have passed through the film are converted into a common logarithmic ratio which is then used to determine changes in the thickness of the film.

When the thickness distribution over the width of the film must be measured, the source of infrared radiation and its accompanying sensor are mounted on a scanning frame that reciprocates width-wise over the film as the film is being rolled up. Precise alignment between the source of infrared radiation and the sensor is important, as the variations in the radiation received by the sensor affects the measurement of the thickness of the film. Any deviation in the alignment between the source of the radiation and the sensor resulting from a machining error in manufacturing the scanning frame introduces measurement errors. An effective way to control the manufacturing cost of the scanning frame is to reduce the scanning error attributable to the deviation in the light axis. Attempts to eliminate the scanning error with prior art infrared measuring devices have not met with success.

With the prior art infrared sensing devices, as the film thickness becomes very thin (less than 50 microns ($\mu$)) (hereinafter the term "mu" will be used), interference results between the infrared rays reflected by the front and back surfaces of the film. The interference increases the measurement error. One proposal to deal with the interference error has been to use diffused infrared rays rather than parallel rays. The use of diffused rays, however, introduces a significant problem of a large zero point shift resulting from the axis deviation between the projector and the receiver. The diffused rays have not significantly improved measurement accuracy.

Japanese patent application 115850-1976 discloses a means to prevent the interference of infrared measuring devices by radiating the diffused rays onto the material to be measured. The light rays are projected onto a light scattering plate such as frosted glass, with the resulting scattered light rays being used to irradiate the film. Although the measurement accuracy is enhanced by eliminating the interference of the irradiated light with respect to the smooth film surfaces and relatively rough film surfaces, this means is effective only for film thicknesses down to 100 mu. Other devices have been proposed using a high powered infrared radiation source, but they have been low in efficiency and do not meet industry demands.

SUMMARY OF THE INVENTION

Accordingly, one object of the present invention is to provide an infrared film thickness measuring device in which the infrared rays that pass through the film being measured are collected in the infrared detector without any energy loss so that extremely thin films as well as films with a high degree of surface planeness can be measured with a high degree of accuracy.

One embodiment of the present invention includes a light projector containing an infrared radiation source, a rotating disk with band-pass filters mounted on the disk, and a light receiver containing an infrared detector positioned on the other side of the film to be measured. A first reflector is mounted on the projector side of the film and has a concave hemispherical reflecting source with a hole in the center through which the infrared rays pass. The concave reflecting surface is disposed towards the film. A second reflector is mounted on the projector side of the film and has a convex spherical or conical reflecting surface facing the first reflector. A light collecting guide is provided on the light receiving side of the film and has a conical reflecting surface with an infrared detector positioned at the apex. The infrared detector converts the light intensities into electrical signals which are input to an electronic data processing and display unit to calculate the film thickness, which is indicated on the display unit.

BRIEF DESCRIPTION OF THE DRAWINGS

A more complete understanding of the invention and its advantages will be apparent from the following Detailed Description taken in conjunction with the accompanying drawings in which.

DETAILED DESCRIPTION

Figure 1:
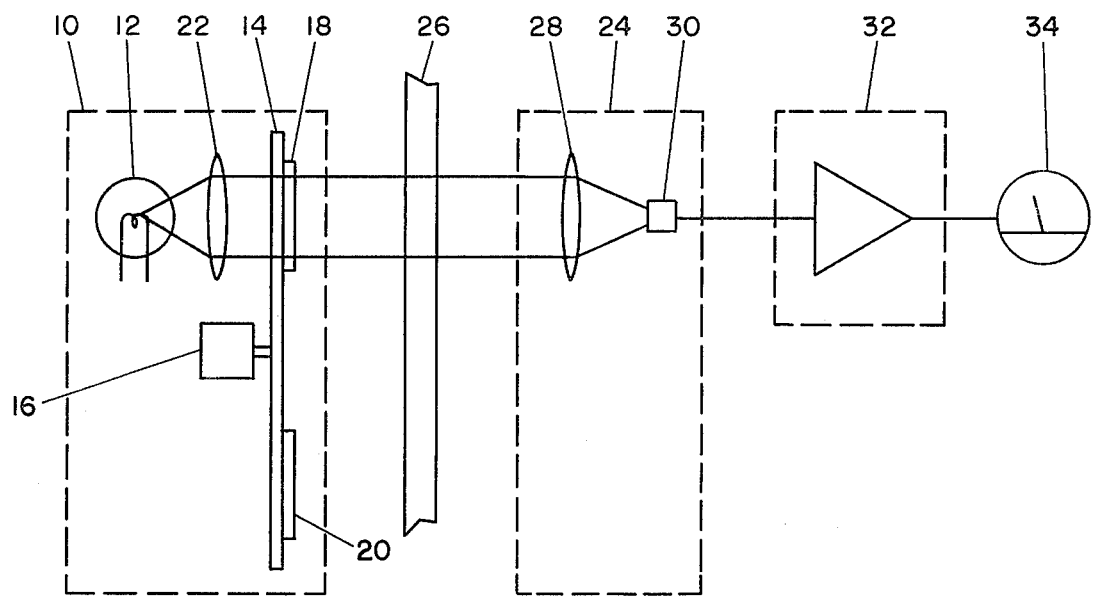
FIG. 1 is a schematic representation of a prior art infrared ray film thickness measuring device.

In FIG. 1, reference numeral 10 designates an infrared light projector from which beams of infrared light are emitted. The projector 10 includes an infrared radiation source 12, such as a tungsten bulb and a glow bar lamp, selected according to the wavelength of infrared light required, and a shutter comprising a disk 14 rotated by a synchronous motor 16. The rotating disk 14 has two apertures formed 180° apart and positioned near the circumference. Band-pass filters 18 and 20 are positioned over the apertures in the rotating disk 14. The band-pass filter 18 permits infrared light having a reference wavelength lambda$_R$ to pass, while the filter 20 permits infrared rays having a measurement wavelength lambda$_M$ to pass. A lens 22 is positioned between the infrared radiation source 12 and the band-pass filters 18, 20 to focus the diffused beams of the infrared rays emitted from the source 12 into parallel beams. Thus, the parallel beams of infrared radiation leaving the lens 22 are filtered by the band-pass filters 18, 20.

A light sensor 24 is disposed a fixed distance from the light projector 10, with the film 26 to be measured moving continuously therebetween. The sensor 24 includes a light collecting lens 28 with its axis aligned with the axis of the lens 22. An infrared detector 30 is positioned at the focusing point of the light collecting lens 28 and may comprise a photoelectric cell such as a lead sulfide cell or a lead selenide cell. The infrared detector 30 is connected to an electronic circuit 32 which is in turn connected to a meter 34 to indicate the thickness of the film 26.

In this prior art system, the lens 22 converts the beams of infrared rays from the source 12 into parallel beams which are then filtered by the band-pass filters 18, 20 so that only those rays with the reference wavelength lambda$_R$ and the measurement wavelength lambda$_M$ are alternately applied to the film 26 being measured. The infrared detector 30 detects the infrared rays that pass through the film 26. The outputs from infrared detector 30 indicating the intensities of the received infrared rays of wavelengths lambda$_R$ and lambda$_M$ are sent to the electronic circuit 32 where the logarithmic ratio between the two wavelengths is calculated to determine the thickness of the film 26 and displayed on meter 34.

While the prior art thickness measuring device of FIG. 1 continuously measures the thickness of a film and is a safe device and easy to handle, it suffers from a significant drawback when the film becomes very thin, e.g., less than 50 mu. An interference occurs between the rays reflected by the front and back surfaces of the film resulting in increased error of measurement. For such films as polyethelene-terephthalate film and polypropylene film, whose surfaces have a very high degree of planeness, a multibeam interference is apt to occur, thereby changing the amount of transmitted light and increasing the measurement error.

Figure 2:
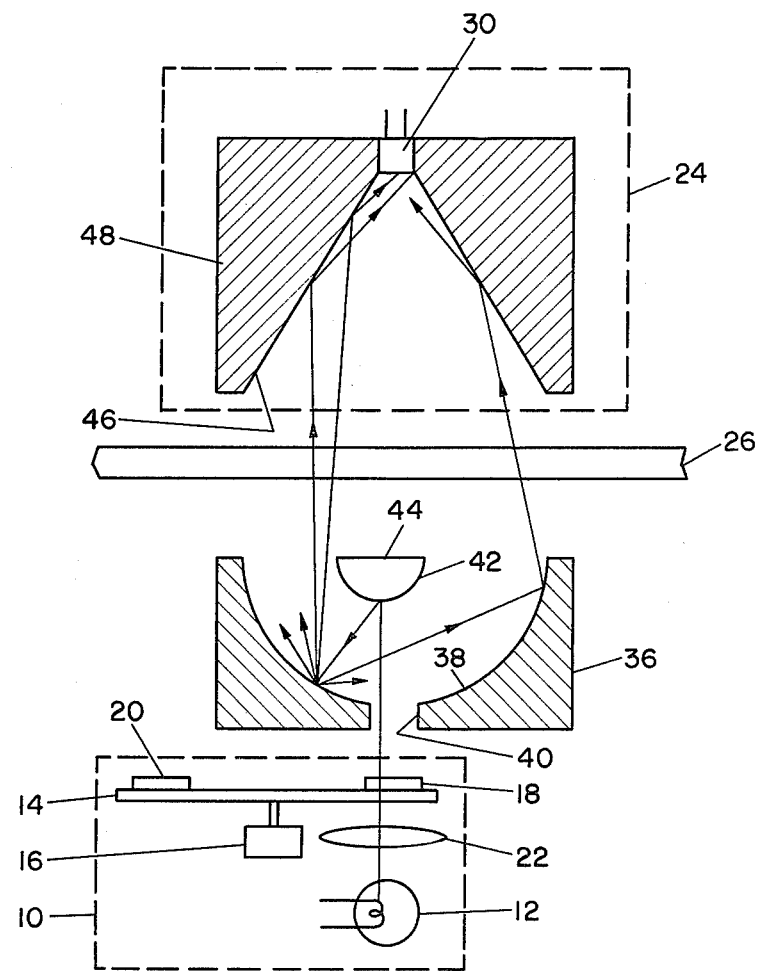
FIG. 2 is a cross-sectional schematic embodiment of an infrared ray film thickness measuring device according to the present invention.

In FIG. 2, the basic elements of a preferred embodiment of this invention are disclosed, with members of this embodiment identical with those of the prior art device of FIG. 1 designated by the same reference numerals. The light projector 10 contains a shutter and an infrared light source 12 such as a tungsten lamp which emits infrared radiation at a predetermined wavelength range, preferably 1.6 to 1.9 mu or 2.0 to 2.6 mu. The shutter comprises a rotating disk 14 made of a material opaque to the infrared rays and includes a synchronous motor 16 for rotating the disk 14. The disk 14 has two band-pass filters 18, 20 with a half-band-width of 200 to 400 nm (nanometers). The band-pass filter 18 transmits the infrared rays of a reference wavelength lambda$_R$, characterized by a small absorption coefficient, meaning that only a small portion of the infrared radiation of this wavelength is absorbed by the film being measured. The other band-pass filter 20 on the rotating disk 14 passes only the infrared rays of a measurement wavelength lambda$_M$, which has a larger absorption coefficient than the reference wavelength lambda$_R$.

A lens 22 is positioned between the band-pass filters 18, 20 on the rotating disk 14 and the infrared ray source 12 for converting the emitted infrared rays into parallel beams.

A light sensor 24 receives the beams of infrared rays emitted by the light source 12. The film 26 to be measured runs continuously in one direction between the light projector 10 and the light sensor 24.

A first reflector 36 is rigidly positioned on the side of the film 26 with the light source 12 and having the band-pass filters 18, 20 disposed therebetween. The first reflector 36 is a rectangular block with a high reflection efficiency and has an interior hemispherical concave reflecting surface 38 which is sand blasted or coated with reflecting material, such as barium, to provide an uneven surface for diffused reflection. The reflector has a hole 40 of a sufficient diameter formed in the hemispherical concave reflecting surface 38 to enable the beam of infrared rays emitted from the projector 10 to pass through the hole 40 in the first reflector 36.

The concave reflecting surface 38 is disposed so that the light is reflected toward the film 26, as illustrated in FIG. 2. The hole 40 is disposed so that the center aligns with the axis of the lens 22 and the infrared light source 12. A second reflector 44 is provided near the center of the concave reflecting surface 38 and is supported by an appropriate means (not shown). The second reflector 44 has a convex hemispherical, smooth reflecting surface 42 facing the concave reflecting surface 38.

The light receiver 24 contains a light collecting guide 48 having a conical reflecting surface 46, which is finished to provide a very smooth mirror surface. An infrared detector 30, preferably comprising a photocell, is positioned at the apex of the conical reflecting surface 46.

The operation of the apparatus according to the invention is now to be explained. Referring to FIG. 2, the lens 22 converts beams of infrared light emitted by the light source 12 into parallel beams which are alternately filtered by the band-pass filters 18, 20 attached to the rotating disk 14. The filters 18 and 20 transmit only infrared rays of a wavelength lambda$_R$, the reference wavelength, and lambda$_M$, the measurement wavelength. The transmitted infrared beams then pass through the hole 40 formed in the first reflector 36.

The infrared beams are then reflected by the convex reflecting surface 42 of the second reflector 44. The reflected beams are scattered by the concave reflecting surface 38 of the first reflector 36, and the diffused infrared rays pass through the film 26 being measured into the light sensor 24. The transmitted rays are reflected by or guided along the conical reflecting surface 46 of the light collecting guide 48 toward the infrared detector 30. Since the infrared rays of reference wavelength lambda$_R$ and of measurement wavelength lambda$_M$ alternately enter the infrared detector 30, the detector alternately produces electric outputs representing the intensity of each wavelength. The outputs are then sent to an electronic circuit, as in FIG. 1, where the logarithmic ratio of the transmitted light intensities of the two wavelengths are calculated to determine the thickness of the film.

Since most of the infrared rays reflected in a diffused manner by the concave surface 38 of the first reflector 36 are incident on the conical reflecting surface 46 of a light collecting guide 48 and converge into the infrared detector 30, electric signals with a high signal to noise ratio can be obtained, thus assuring high accuracy and reliability in the measurement of film thickness.

As the apex angle of the conical reflecting surface 46 increases, the rays tend to be reflected by this surface toward the film 26 instead of the infrared detector 30, with a smaller part of the rays reaching the detector 30. Experimental results indicate that a preferred apex angle is between 20° and 60°. At an apex angle of 40°, an output signal from sensor 30 was 2.5 times greater than the output signal when the apex angle was 100°.

A further advantage of the present invention is that the diffused rays are incident on the film from various angles because the concave reflection surface 38 reflects the infrared beams before they pass through the film 26. Interference between the rays reflected by the front and back surfaces of the film, which might occur with parallel beams, can be eliminated, thus minimizing possible errors in measurement.

Figure 3:
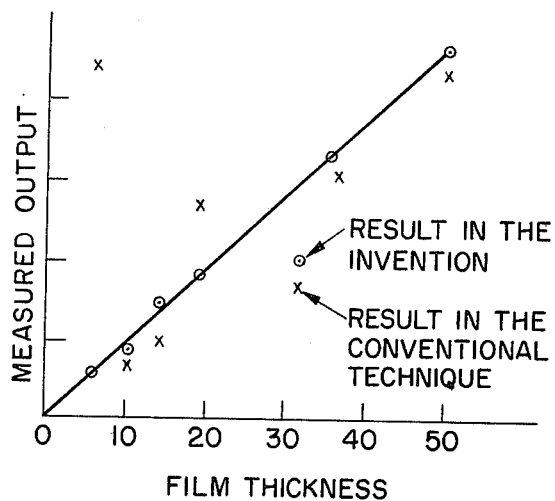
FIG. 3 is a graphical depiction of test results comparing measurements taken with the prior art device of FIG. 1 with the embodiment of the invention in FIG. 2, with measured output on the vertical axis and film thickness on the horizontal axis.

In FIG. 3, the results of measurement of film thickness using an embodiment of the present invention is illustrated. To produce this graphical depiction, band-pass filters with a half-band-width of 200 to 400 nm were used to measure a polyethylene teraphthalate film, which has a very high degree of surface planeness. Such a film, if measured by parallel beams of a prior art device, would produce interference even for a thickness of about 100 mu, thereby detracting from the accuracy of the measurement.

From FIG. 3, it can be concluded that the apparatus of the present invention can limit the measurement error to less than one mu for a very thin film ranging in thickness from 1 to 10 mu. Further, the errors created by the interference between the incident infrared rays are greatly decreased, improving the accuracy when compared with a prior art device using parallel beams of infrared radiation.

Almost all the infrared rays of both the reference wavelength lambda$_R$ and the measurement wavelength lambda$_M$ that have been reflected by the concave surface 38 of the first reflector 36 reach the conical reflecting surface 46 of the light collecting guide 48 to be further reflected and converged into the infrared detector 30. This insures stable outputs and obviates using a light source with a high power, thus enabling the use of a small light source of about 10 to 30 watts.

Accordingly, this invention can measure plastic films, such as polyethylene-terephthalate or polypropylene, with a degree of accuracy of less than one mu. The present invention can also be used to measure films having a very high degree of planeness as well as very thin films, such as 10 mu to 20 mu, without producing interference by multiple reflections.

The present invention is also effective in the quality control of film since it enables a continuous measurement of film thickness as the film is produced, by running the film between the light projector and the light receiver. A thickness gauging device of the present invention is very safe to handle and operate as compared with prior art devices using radioactivity. The projector and receiver are also substantially simpler and more compact than radioactive source measuring gauges, this effecting substantial reduction in overall production cost.

The present invention was tested with light collecting guides 48 formed with conical and hemispherical surfaces. The light intensity obtained with the hemispherical surface was about one-third or one-quarter of that reflected by the conical surface. Accordingly, a hemispherical reflecting surface is decidedly inferior.

Figure 4:
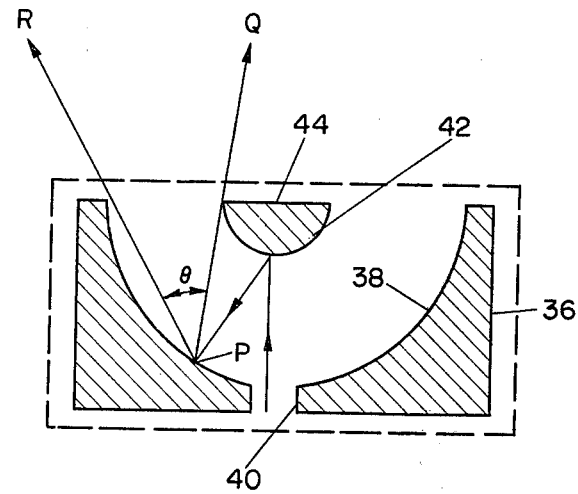
FIG. 4 is a cross-section of the reflectors of the embodiment of the invention in FIG. 2.

In FIG. 4, a cross-sectional view of the first and second reflectors 36, 44 illustrates how the diffused infrared rays are produced. The infrared rays pass through the hole 40 formed in the bottom of the concave reflecting surface 38 of the first reflector 36, and enter a diffused radiating region where the rays are reflected by the smooth convex reflecting surface 42 and then are further reflected in a diffused manner at a point P on the concave reflecting surface 38 to be directed toward the film (not shown) being measured. The beams of infrared rays reflected at the point P toward the film are within a sector with an apex angle of theta defined by lines PQ and PR.

Figure 5:
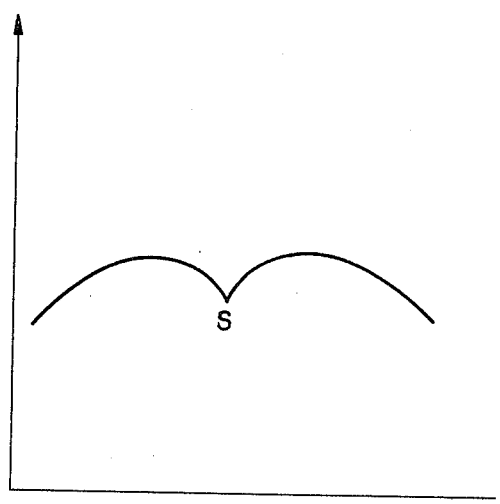
FIG. 5 is a diagrammatic representation of the output of the reflectors of FIG. 4, with the vertical axis measuring illumination and the horizontal axis measuring the position along the open diameter of the concave reflector of FIG. 4.

The light intensity distribution of the diffused infrared rays entering the light receiver (not shown) is shown in FIG. 5. From the diagram, it can be concluded that a drop in the light intensity occurs behind the second reflector 44, as indicated by the symbol S in the diagram.

Figure 6:
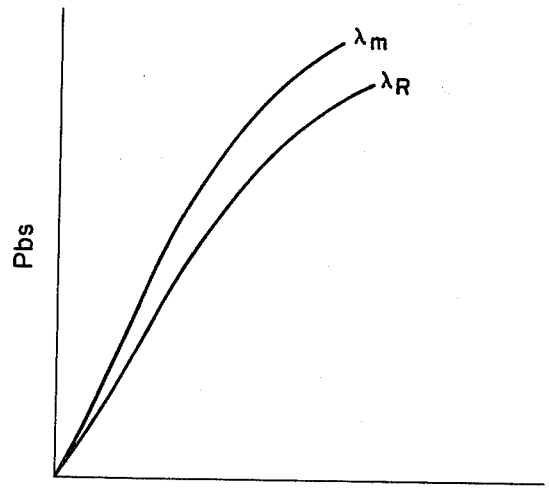
FIG. 6 is a diagram of the output of a lead sulfide cell in an infrared ray detector with the output on the vertical axis and the incident light intensity on the horizontal axis.

The output characteristic or resistance variation versus the incident light intensity as exhibited by the photoelectric cell 30, such as a lead sulfide cell or a lead selenide cell, positioned in the light receiver 48 varies depending on the wavelength of the incident light. A lead sulfide cell gives a characteristic curve illustrated in FIG. 6. Since the output characteristic exhibited by the photoelectric cell for infrared rays of reference wavelength lambda$_R$ differs from that of the measurement wavelength lambda$_M$, the photoelectric cells's output ratio between the two wavelengths will change even if the infrared ray intensity for both the wavelengths lambda$_R$ and lambda$_M$ varies by the same proportion. Furthermore, since the light intensity drops behind the second reflector 44 as shown at S in FIG. 5, the intensity fluctuation of the incident infrared rays as caused by the slight axis deviation between the projector and the receiver is magnified, producing a zero point shift.

Figure 7:
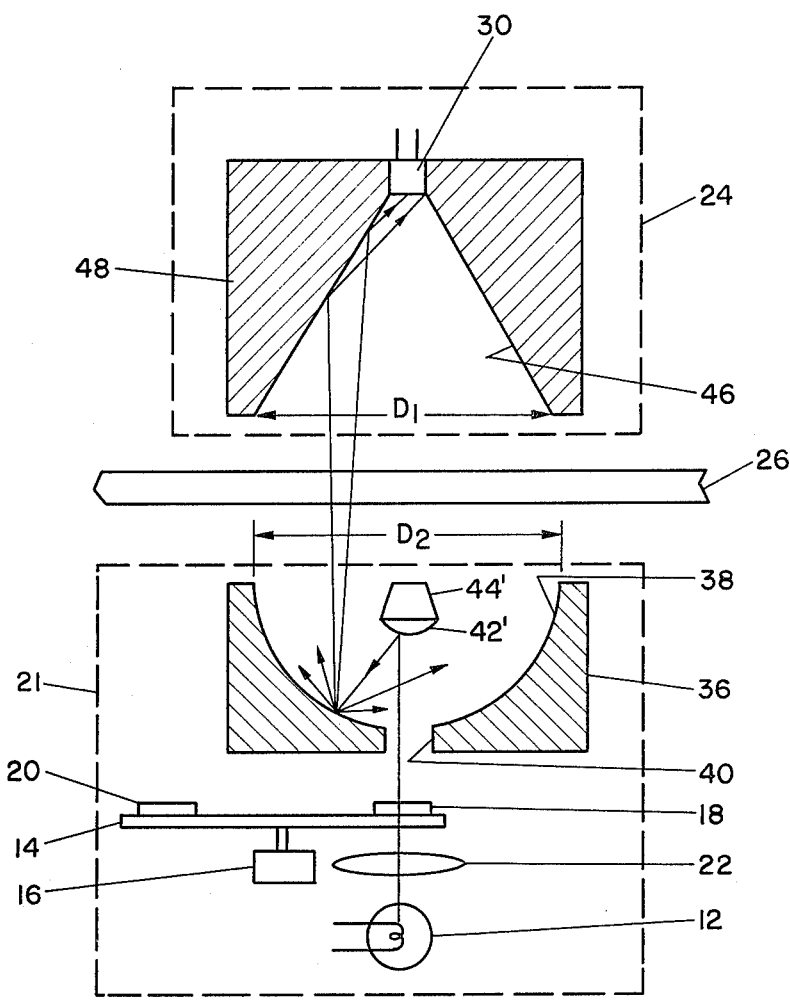
FIG. 7 is a schematic cross-section of an alternate embodiment of the present invention.

FIG. 7 illustrates an embodiment of the present invention similar to the embodiment of FIG. 2, except that the second reflector 44 of FIG. 2 has an alternate configuration, as designated by the reference numeral 44', with a convex reflecting surface 42'.

Figure 8A:
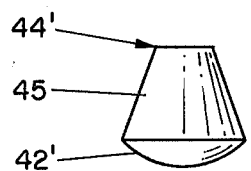
FIG. 8(a) is a side view of the second reflector of the embodiment of the invention in FIG. 7, with FIG. 8(b) representing a perspective view.
Figure 8B:
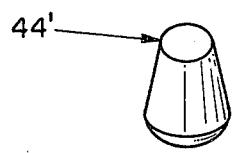

In FIG. 8, the second reflector 44' comprises a truncated cone portion 45 and a spherical portion 42' formed at the bottom of the truncated cone. The convex reflecting surface 42' is finished to provide a very smooth surface.

Figure 9A:
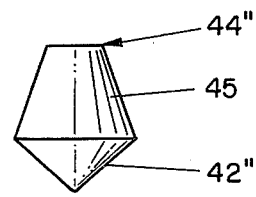
FIG. 9(a) is a side view of another embodiment of the second reflector of the present invention, with FIG. 9(b) representing a perspective view.
Figure 9B:
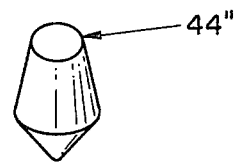

In FIG. 9, another second reflector 44" is illustrated in which a conical convex reflecting surface 42" is formed at the bottom of the truncated cone 45. As in the embodiment of FIG. 8, the convex reflecting surface 42" is finished to provide a smooth surface.

Referring again to FIG. 7, the diameter D$_1$ of the conical reflecting surface 46 at the bottom is smaller than the diameter D$_2$ of the concave reflecting surface 38 of the first reflector 36 at its open end.

Referring to FIG. 7, the lens 22 focuses the infrared radiation emitted from the source 12 into parallel beams which are then filtered by the band-pass filters 18, 20 positioned on the disk 14 so that the infrared rays of reference wavelength lambda$_R$ and of measurement wavelength lambda$_M$ alternately pass through the hole 40 of the first reflector 36. These infrared rays are then reflected by the convex reflecting surface 42' of the second reflector 44'. The rays reflected by the surface 42' are further reflected and diffused by the concave reflecting surface 38 of the first reflector 36 toward the film 26. After the rays have passed through the film 26, they are reflected by the concave conical reflecting surface 46 of the light collecting guide 48 to converge in the infrared ray detector 30.

As previously discussed, the infrared rays of reference wavelength lambda$_R$ and of measurement wavelength lambda$_M$ alternately enter the detector 30, which converts the intensity of the rays into electric signals. These signals are sent to an appropriate electronic circuit where the transmitted light intensity ratio between the two wave-lengths is converted into a logarithmic ratio to determine the film thickness as displayed on a meter (not shown).

Figure 10:
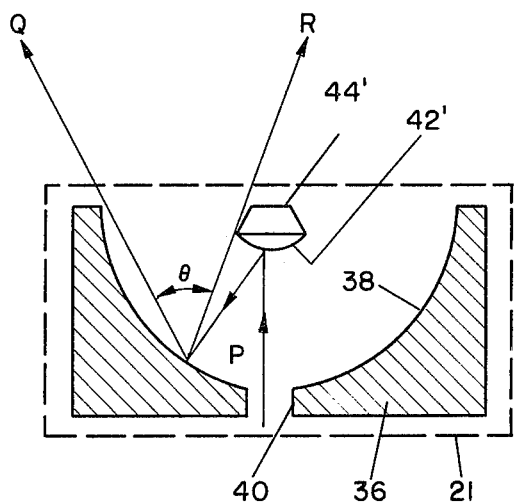
FIG. 10 is a cross-section of the reflectors of the embodiment of the invention in FIG. 7.

The blocking of the diffused rays by the second reflector 44' is illustrated in FIG. 10. The second reflector 44' comprises a truncated cone 45 and a convex reflecting surface 42', which may be formed of a portion of a sphere (but not hemispherical). Part of the rays are reflected at the point P on the concave reflecting surface 38 of the first reflector 36, and propagate as indicated by a line PR. Since the second reflector 44' has its base formed in a truncated cone, the proportion of the diffused rays that are blocked by the second reflector 44' is very small, and the diffusing angle theta of the beams traveling toward the film 26 is larger than that as depicted in FIG. 4.

Figure 11:
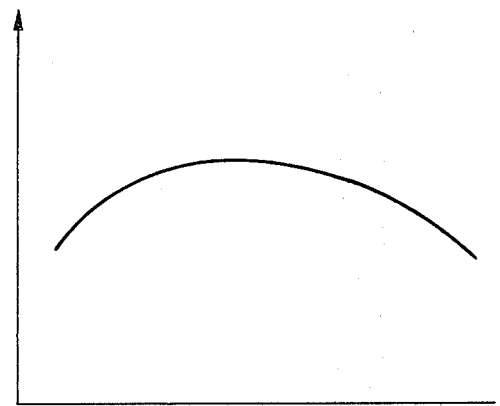
FIG. 11 is graphical depiction of the light intensity distribution over the reflecting surface of the receiver when used in conjunction with the reflectors of FIG. 10.

As a result, the light intensity distribution at the receiver 24 is as illustrated in FIG. 11, wherein the light intensity near the light axis of the sensor 24 is nearly constant.

Since the open end diameter D$_1$ of the conical reflecting surface of the light collecting guide 48 is smaller than the open end diameter D$_2$ of the concave reflecting surface 38 of the first reflector 36, the amount of light entering the collecting guide 48, if the axes of the projector 21 and sensor 24 should deviate from each other, will remain at almost the same level, minimizing the amount of shift of zero point.

Figure 12:
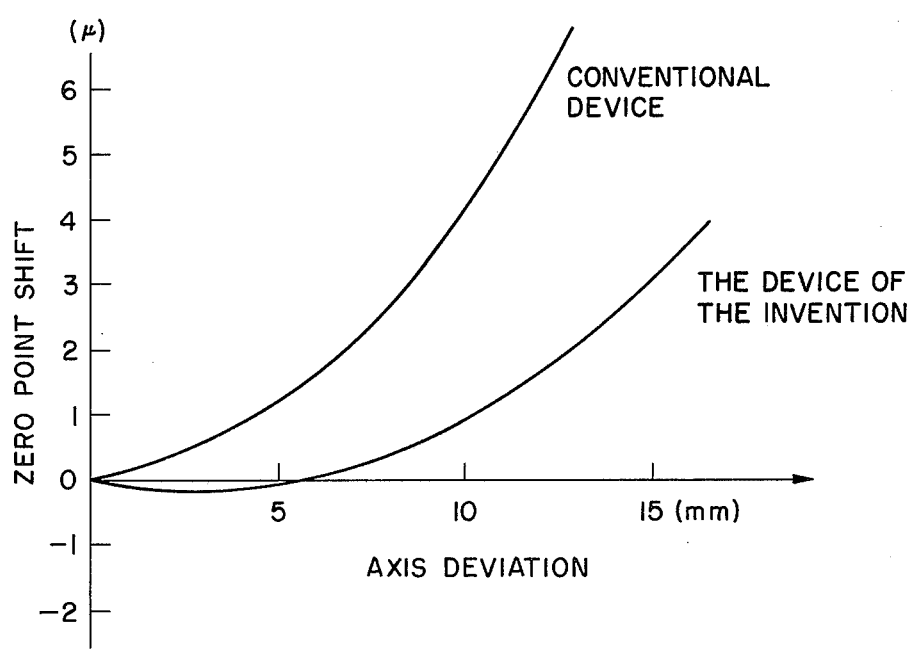
FIG. 12 is a graphical depiction of the zero point shift caused by axis deviation between the projector and the receiver for a conventional infrared thickness measuring device and for a device in accord with the present invention.

In FIG. 12, the result of measuring the zero point shift produced by the axis deviation between the receiver and projector of a conventional infrared ray film thickness measuring device and for the device according to the present invention are illustrated. It can be concluded that for the same amount of axis deviation, the zero point shift of this invention is as small as one quarter of that of a prior art device. Accordingly, this inventon can allow greater machining error than can the conventional device in producing the scanning frame to which the projector and receiver are mounted. This contributes to a substantial reduction in production costs of the scanning frame. For example, in order to limit the scanning error to 0.1 mu, the scanning frame must only be manufactured so that the deviation of axes of the projector and receiver is within about ±1 millimeter.

According to this invention, the zero point shift can be minimized even if there is some axis deviation between the projector and the receiver, so that a highly accurate measurement of film thickness can be performed. Since the invention can tolerate greater machining error in manufacturing the scanning frame, production costs can also be significantly reduced.

While more than one embodiment of the present invention has been described in detail herein and illustrated in the accompanying drawings, various further modifications may be made without departing from the spirit and scope of the invention.

We claim:

1. A device for measuring the thickness of a thin film or the like comprising:
   a source of infrared rays positioned on one side of said film;
   a disk with at least two apertures rotatably mounted between said infrared source and said film;
   band-pass filters disposed over said apertures in said disk for filtering said infrared rays;
   a concave, hemispherical reflector with a reflector surface facing said film and having a hole therein and positioned between said infrared source and said film whereby said infrared rays pass through said hole;
   a convex reflector positioned between said film and said concave reflector and having a convex reflecting surface facing said concave reflector; and
   a light collecting guide with means for sensing said infrared rays, said light collecting guide having a conical reflecting surface and being positioned on the opposite side of said film from said infrared source, said infrared sensing means being positioned at the apex of said conical reflecting surface.

2. The device of claim 1 wherein the open end diameter of said light collecting guide is smaller than the diameter of said concave reflector.

3. The device of claim 1 wherein said convex reflector includes a truncated cone and said convex reflecting surface is formed at the bottom of said truncated cone.

4. The device of claim 3 wherein the open end diameter of said light collecting guide is smaller than the diameter of said concave reflector.

* * * * *